United States Patent [19]

Hoshino

[11] Patent Number: 4,746,231

[45] Date of Patent: May 24, 1988

[54] BEARING DEVICE FOR SMALL ROTARY MACHINES

[75] Inventor: Michio Hoshino, Matsudo, Japan

[73] Assignee: Mabuchi Motor Co., Ltd., Japan

[21] Appl. No.: 102,251

[22] Filed: Sep. 28, 1987

Related U.S. Application Data

[63] Continuation of Ser. No. 865,161, May 19, 1986.

[30] Foreign Application Priority Data

May 23, 1985 [JP] Japan ............................ 60-77023[U]

[51] Int. Cl.⁴ ............................................. F16C 19/06
[52] U.S. Cl. .................................... 384/537; 384/536; 384/539
[58] Field of Search ............... 384/537, 903, 536, 539, 384/585

[56] References Cited

U.S. PATENT DOCUMENTS

| | | | |
|---|---|---|---|
| 4,135,763 | 1/1979 | Kosono et al. | 384/536 |
| 4,229,055 | 10/1980 | Olschewski et al. | 384/536 |
| 4,236,767 | 12/1980 | Feldle | 384/903 |

Primary Examiner—Lenard A. Footland
Attorney, Agent, or Firm—McGlew and Tuttle

[57] ABSTRACT

A bearing device for small rotary machinery having such a construction that a cylindrical bearing having therein a ball bearing is housed in a housing, made of a synthetic resin, for rotatably holding a rotating shaft having a rotor, in which a cap having a flange portion is interposed between the housing and the bearing to stably retain the rotating shaft.

8 Claims, 1 Drawing Sheet

BEARING DEVICE FOR SMALL ROTARY MACHINES

This application is a continuation of application Ser. No. 865,161, filed May 19, 1986, now abandoned.

BACKGROUND OF THE INVENTION

1. Field of the Invention

This invention relates generally to a bearing device for small rotary machinery, and more particularly to a bearing device for small rotary machinery having such a construction that a bearing is housed in a housing, in which a cap having a flange portion is interposed between the housing and the bearing to easily and securely housed and retain the bearing in the housing.

2. Description of the Prior Art

In fixedly fitting a cylindrical bearing having therein a ball bearing to a housing, it has been generally practiced that a bearing is press-fitted directly into a bearing housing provided on a motor case, for example. In such a case, a dimensional difference is provided between the outside diameter of the bearing and the inside diameter of the housing to ensure a sufficient press-fit to fixedly fit a bearing to a housing. In practice, however, it is extremely difficult to maintain the optimum press-fit dimensions due to machining errors and other factors. This could often result in an excessive or insufficient press-fit between the bearing and the housing. Since an insufficient press-fit may lead to a detriment to the motor, the degree of press-fit between the bearing and the housing is usually maintained slightly tighter. This, however, could cause various inconveniences, such as the deformation of the bearing, or an adverse effect on the dimensions of the shaft hole on the bearing.

SUMMARY OF THE INVENTION

This invention is therefore intended to overcome these problems.

It is an object of this invention to provide a bearing device for small rotary machinery in which a bearing is easily and stably housed and retained in a housing for housing the bearing by interposing a cap having a flange portion between the bearing and the housing.

It is another object of this invention to provide a bearing device for small rotary machinery in which when the cap housing the bearing is press-fitted into the housing to the extreme bottom thereof by means of a press-fitting jig, the flange portion of the cap is bent inward by the open end of the housing, causing the end portion, together with the cap flange portion, to be crimped, whereby a tight press-fit is obtained.

Other objects of this invention will become apparent from the following detailed description with reference to the accompanying drawings.

BRIEF DESCRIPTION OF THE DRAWINGS

FIG. 3 (b) is an enlarged view of the essential parts of the press-fit portion shown in FIG. 3 (a).

DESCRIPTION OF THE PREFERRED EMBODIMENT

Figure 1:
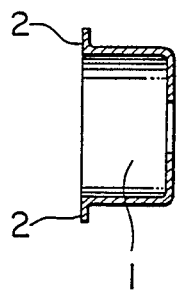
FIG. 1 is a cross-sectional view of a cap embodying this invention.

In the figures, reference numeral 1 refers to a cap; 2 to a flange portion of the cap 1; 3 to a bearing; 4 to a housing; 5 to a press-fitting jig; 6 to a bearing device, respectively.

Figure 2:
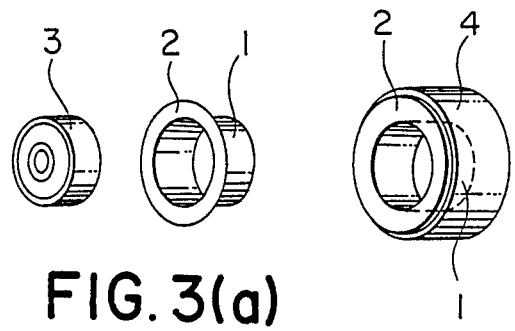
FIG. 2 is a exploded perspective view of assistance in explaining an embodiment of this invention.
Figure 3A:
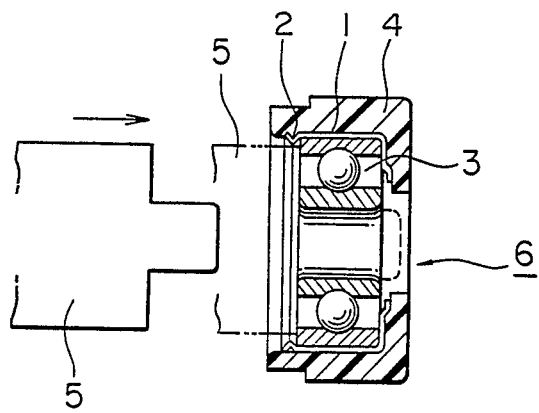
FIG. 3 (a) is a diagram of assistance in explaining the state of press-fit.
Figure 3B:
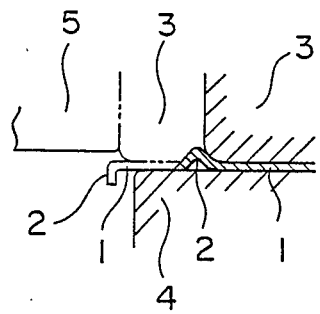

The cap 1 of this invention is a cylinder-made of a cold-rolled steel sheet, as shown in FIGS. 1 and 2. A hole through which a shaft is passed is provided on one closed end face thereof, and the flange portion 2 is formed on the outer periphery of the other open end face. A press-fit allowance is provided between the inside diameter of the cap 1 and the outside diameter of the bearing 3, and the bearing 3 is housed in the cap 1 from the outer cylindrical race of the open end face of the cap 1. The housing 4 has a cylindrical recess; the one end face thereof being closed and having a hole through which a shaft is passed being provided, and the other end face thereof being opened. A press-fit allowance (which need not be so close) is provided between the inside diameter of the housing 4 and the outside diameter of the cap 1, and the cap 1 housing the bearing 3 is press-fitted into the housing 4. FIGS. 3 (a) and (b) show the state where these components are press-fitted. As the cap 1 housing the bearing 3 is press-fitted into the housing 4 by means of the press-fitting jig 5 until the top of the cap 1 reaches the bottom of the housing 4, the flange portion 2 provided on the outer periphery of the cap 1 is bent inward into a V-shaped cross section by the open end of the housing 4. FIG. 3 (b) is an enlarged view illustrating the state of the press-fit. In this way, as the flange portion 2 provided on the cap 1 is bent inward, a crimping force is automatically applied to both the bearing incorporated in the cap 1 and the housing 4, whereby a required press-fit is obtained.

As describe above, this invention makes it possible to provide a bearing device for small rotary machinery in which a sufficient press-fit required for small rotary machinery can be obtained even when a loose-fit allowance is provided between the bearing and the housing, and a housing, made of a molded resin, is not affected by secular changes, and can be manufactured with a simplified manufacturing process.

What is claimed is:

1. A bearing device for small rotary machinery comprising, a ball bearing having a cylindrical outer race, a cylindrical cap having an open end with a flange portion, said race being press fit into said cap so that said bearing is disposed in said cap, a housing made of synthetic resin and having a cylindrical recess with an inner wall, said cap being fit into said cylindrical recess with said flange portion being deformed into a V-shaped cross section projecting and bearing against said inner wall and over said race to retain said cap and said bearing in said housing.

2. A bearing device for small rotary machinery set forth in claim 1 wherein said cap is a cylinder made of a cold-rolled steel sheet.

3. A bearing device for small rotary machinery set forth in claim 1 wherein said flange portion of said cap is provided at one end of said cap, and a hole through which a shaft is passed is provided on the opposite end face of said cap.

4. A bearing device for small rotary machinery set forth in claim 1 wherein said housing is a cylinder; one end face thereof being closed and having a hole through which said shaft is passed and the other end thereof being closed.

5. A bearing device for small rotary machinery set forth in claim 1 wherein a press-fit allowance is provided between the inside diameter of said cap and the outside diameter of said bearing race; said bearing being inserted into said cap from the direction of the flange open end of said cap.

6. A bearing device for small rotary machinery set forth in claim 1 wherein a loose press-fit allowance is not provided between the inside diameter of said housing and the outside diameter of said cap.

7. A bearing device for small rotary machinery set forth in claim 1 wherein when said cap incorporating said bearing is press-fitted into said housing to the extreme bottom thereof by means of a press-fitting jig, the flange portion of said cap is bent inward by the inner wall portion of said housing, whereby a crimping force in applied automatically to both said bearing incorporated in said cap and said housing, thus imparting a sufficient press-fit.

8. A bearing device for small rotary machinery set forth in claim 1 wherein said flange portion of said cap bent inward by the inner wall of said housing is crimped in a virtually V-shape in cross section.

* * * * *